United States Patent
Puttmann

(10) Patent No.: US 6,510,905 B1
(45) Date of Patent: Jan. 28, 2003

(54) EARTH BORING APPARATUS

(75) Inventor: Franz-Josef Puttmann, Lennestadt (DE)

(73) Assignee: Tracto-Technik-Paul Schmidt Spezialmaschinen, Lennestadt (DE)

(*) Notice: Subject to any disclaimer, the term of this patent is extended or adjusted under 35 U.S.C. 154(b) by 0 days.

(21) Appl. No.: 09/498,538

(22) Filed: Feb. 4, 2000

(30) Foreign Application Priority Data

Feb. 6, 1999 (DE) .......................................... 199 04 864

(51) Int. Cl.$^7$ ................................................ E21B 4/06
(52) U.S. Cl. ........................................................ 175/19
(58) Field of Search .............................. 175/19, 21, 22, 175/23, 62, 73, 45, 89, 162, 172, 212, 296, 306, 424

(56) References Cited

U.S. PATENT DOCUMENTS

| 923,371 | A | * | 6/1909 | Palmer et al. | ................. 175/19 |
|---|---|---|---|---|---|
| 2,046,456 | A | * | 7/1936 | Johnson | ....................... 175/19 |
| 3,087,560 | A | * | 4/1963 | Dodson | ........................ 175/22 |
| 4,002,777 | A | * | 1/1977 | Juvinall et al. | ................ 427/27 |
| 4,416,494 | A | * | 11/1983 | Watkins et al. | ................ 339/15 |
| 4,618,007 | A | * | 10/1986 | Kayes | ........................... 175/19 |
| 4,647,072 | A | * | 3/1987 | Westman | ....................... 285/15 |
| 4,834,193 | A | * | 5/1989 | Leitko, Jr. et al. | ............. 175/19 |
| 5,010,965 | A | * | 4/1991 | Schmelzer | .................... 175/19 |
| 5,025,868 | A | * | 6/1991 | Wentworth et al. | ............ 173/91 |

FOREIGN PATENT DOCUMENTS

| DE | 2403397 A1 | 7/1975 | ............ F16L/21/08 |
|---|---|---|---|
| DE | 2832763 B2 | 2/1980 | ............ F16L/11/10 |
| DE | 3502445 A1 | 1/1985 | ............ F16L/11/10 |
| DE | 1953097 C2 | 2/1997 | ............ E21B/7/26 |
| WO | WO 94/05941 | 3/1994 | ............ F16L/1/00 |

* cited by examiner

Primary Examiner—Robert E. Pezzuto
(74) Attorney, Agent, or Firm—Schwegman, Lundberg, Woessner & Kluth, P.A.

(57) ABSTRACT

In the case of an earth boring apparatus, preferably a thrust boring apparatus, the head of which is actuated by a pneumatically operated reciprocating ram, a supply hose (5) provides the connection from a compressor as an example to the thrust boring apparatus which also serves to reverse the direction of operation by the rotation of the hose. To ensure error-free control over greater lengths of hose and to avoid kinking—partly due to the pressure from surrounding ground—the hose (5) is equipped with a snugly fitting corset (12) in the form of a spring wire spiral or a woven wire support.

19 Claims, 3 Drawing Sheets

EARTH BORING APPARATUS

FIELD OF THE INVENTION

The invention relates to a reversible earth boring apparatus with a supply hose for the delivery of compressed air for instance to a pneumatically operated reciprocating ram.

BACKGROUND OF THE INVENTION

Equipment of this type, such as thrust boring equipment as described in the German patent specification 195 30 972, has been employed with great success in trenchless cable laying or destructive replacement of underground cables/mains. Such equipment requires reversing facilities to recede from the borehole it has created in order to be able to drive blind boreholes or to prevent the necessity of having to dig it out if it became lodged by an obstacle underground which it could not penetrate.

With regards to the reversing facility there are a number of known systems, all based on the principle of not directing the energy of the thrust of the transversely moving piston in the driving direction into the equipment casing but in the opposite direction by employing a stop/butt integrated into the rear end of the casing. This is done simply by moving a tubular spool, for instance, within the casing in such a way that the lands which control the timing for exhausting the cylinder space in front of the thrust piston located at the front of the equipment are axially displaced.

Where the reversal of travel of the disclosed equipment from forward to backward and vice versa takes place by means of mechanical adjustment of a spool or control sleeve for example, the air supply hose offers itself as a means of operating the control element from a remote position outside the borehole. There are a number of examples which have in common the reversal of direction of travel achieved by rotating the supply hose.

The laid-open PCT patent application WO 94/05941 also discloses a boring apparatus with a cone type steering head provided with a pivoting arrangement within the casing, the pivoting axis being inclined in relation to the longitudinal axis of the casing. At the same time the contact areas which extend at right angles to the pivoting axis also run at an angle in relation to the longitudinal axis of the casing. Thus the casing of the apparatus can be rotated about its longitudinal axis whilst the steering head is held in position by the surrounding earth. By rotating the casing in such a way that the steering head can be brought into an eccentric position in relation to the casing of the apparatus, directional changes of travel can be produced.

To divert the thrust boring apparatus from its course going straight ahead to a particular path the casing must be rotated by means of the air hose far enough for the equipment to reach the required angle position (starting position) for the desired path.

Such a rotating manoeuvre is only possible with the aid of the air hose connected to the rear end of the apparatus. This, however, causes a number of problems since the air hose must not be rigid for which reason it cannot be torsion-free either. In addition there is the problem that the thrust boring apparatus needs to overcome the friction between it and the surrounding earth during any rotating movement. This friction can be considerable and depends on the soil condition, the outer diameter and the length of the apparatus so that in the case of a well progressed borehole and a correspondingly long supply line (air hose) it is often no longer possible to rotate the casing in its location underground or to summon the forces required for such an operation.

The friction between casing and the surrounding earth could be avoided if the front section of the apparatus were to have a larger diameter than the remainder of it. This, however, would fail due to the fact the friction between the casing and the surrounding earth is essential since the earth needs to take up the reaction forces directed in the opposite direction to the driving direction.

In order to reduce the friction caused by the surrounding earth, the casing can be connected to the supply hose in such a way, that rotation (between hose and apparatus) is prevented. At the same time it can be accommodated in a jacket tube. If the hose is rotated now the apparatus can rotate with it inside the jacket tube and therefore with little friction.

A further disadvantage of the disclosed apparatuses with air hose lies in the fact that, due to the torsion of the air hose outside the borehole, it cannot be ascertained, at least not with the required precision, at what point the control sleeve or the thrust boring apparatus starts to rotate, by what angle it actually rotates, and after what rotation angle the rotation is complete.

Since precise directional boring is only possible if the steering head, the control sleeve, or the adjustable steering element takes up a predetermined angular position relative to the casing of the thrust boring apparatus, it is decisive in practical terms to rotate the apparatus casing only long enough and far enough until the predetermined steering angle has been reached.

With increasing distance or length of hose the torsion of the hose shows adverse effects. Situations can arise where this already occurs at hose lengths above 20 m resulting in strangulating and squashing of the hose which can result in a total interruption of the air supply. This risk is particularly high in summer temperatures since the compressed air being at ambient temperature rushes past the hose wall at great velocity transferring a large amount of its heat to the hose.

SUMMARY OF THE INVENTION

The object of the invention therefore is to increase the torsional strength of conventional supply hoses for thrust boring apparatuses in such a way as to enable a safe control action and thus directional precision.

The problem addressed by the invention is to provide the hose either inside or outside with a snugly fitting corset. The corset, which could have the form of a spring wire spiral or woven wire, would prevent the collapsing of the hose. It would provide the hose with great torsional strength and dimensional stability. The hose would retain sufficient flexibility to be wound up for transport purposes. Expandable woven wire tubes are particularly suitable for stabilizing the hose, the diameter of which is reduced by increasing tension if pulled from both ends and increased to its maximum when the tension is eased off.

Such support tubes can easily be drawn into a conventional air hose if required, even at the building site, as the drawing action will reduce its diameter significantly due to the drawing force. If the maximum diameter of the support tube is smaller in its relaxed state than the inside diameter of the air hose then the support hose will fit snugly against the inner wall of the supply hose without being displaced.

For greater lengths it is usual to use supply hose sections joined together by several couplings. In such a case the corset would extend from coupling to coupling of a hose section. The corset would preferably be fastened to the couplings so that, in the case of expansion, the hose would remain supported over its full length. The fastening to the couplings would also prevent the corset, in the case of a spiral spring, from shrinking in length during operation. For fastening purposes the corset can be provided with a hook at the hose ends which could be hooked into an opening provided at the coupling.

The stabilising of the supply hose with the aid of a corset is particularly advantageous if the supply hose accommodates not only the duct for the compressed air but also another hose carrying control air by which a control sleeve in the thrust boring apparatus could, for instance, be operated to reverse the direction of operation.

The application of a corset according to the invention permits safe adjustments of steering elements in the apparatus or the reversing of the direction of operation. So far this could only be achieved by means of a linkage. Such measures are also possible with commercially available supply hoses since the corset can easily be inserted into such hoses, particularly into woven hoses, but also removed from them. A further advantage is the fact that the supply hose according to the invention can be wound up and transported as a coil. In addition, the corset in the form of a spring wire spiral, can be used for data transmission between the apparatus and the receiver or control equipment above ground. Finally the corset could also be integrated into the hose wall.

BRIEF DESCRIPTION OF THE DRAWINGS

Embodiments of this invention will now be described by way of example with reference to the accompanying drawings. The drawings show:

FIG. 1 depicts a thrust boring apparatus 2 in the ground 1 with a supply hose 3 extending through a pit 4 to a compressor above ground which is not shown. The supply hose is subject to two 90° directional changes and an increasing amount of ground friction as the thrust boring apparatus 2 is driven further into the ground 1. This is due to the fact that part of its circumference rests on the more or less rough and rugged floor of the borehole which extends from the thrust boring apparatus to the pit of the trench 4.

DESCRIPTION OF THE PREFERRED EMBODIMENT

Figure 1:
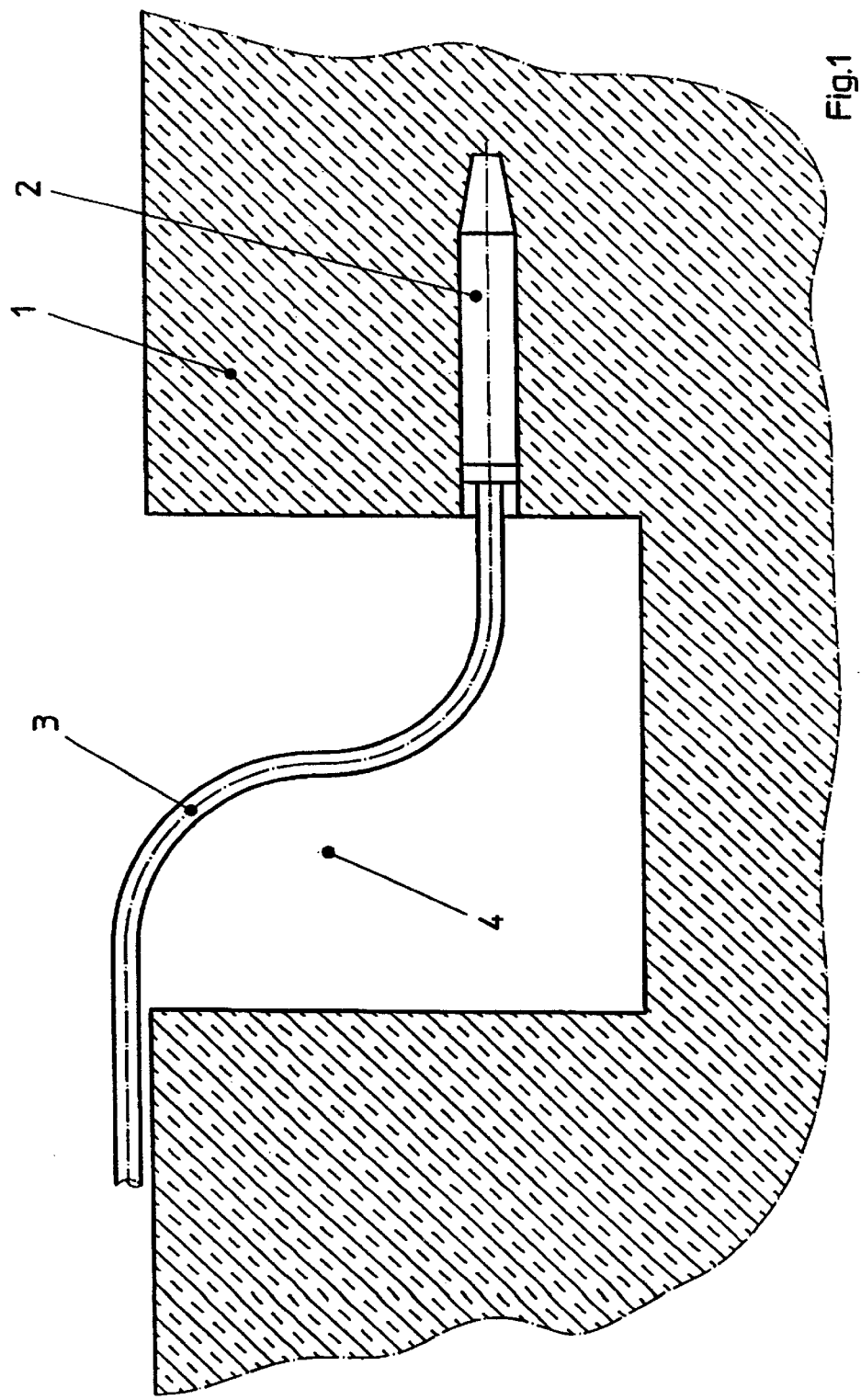
FIG. 1 a thrust boring apparatus with its supply hose below ground.
Figure 2:
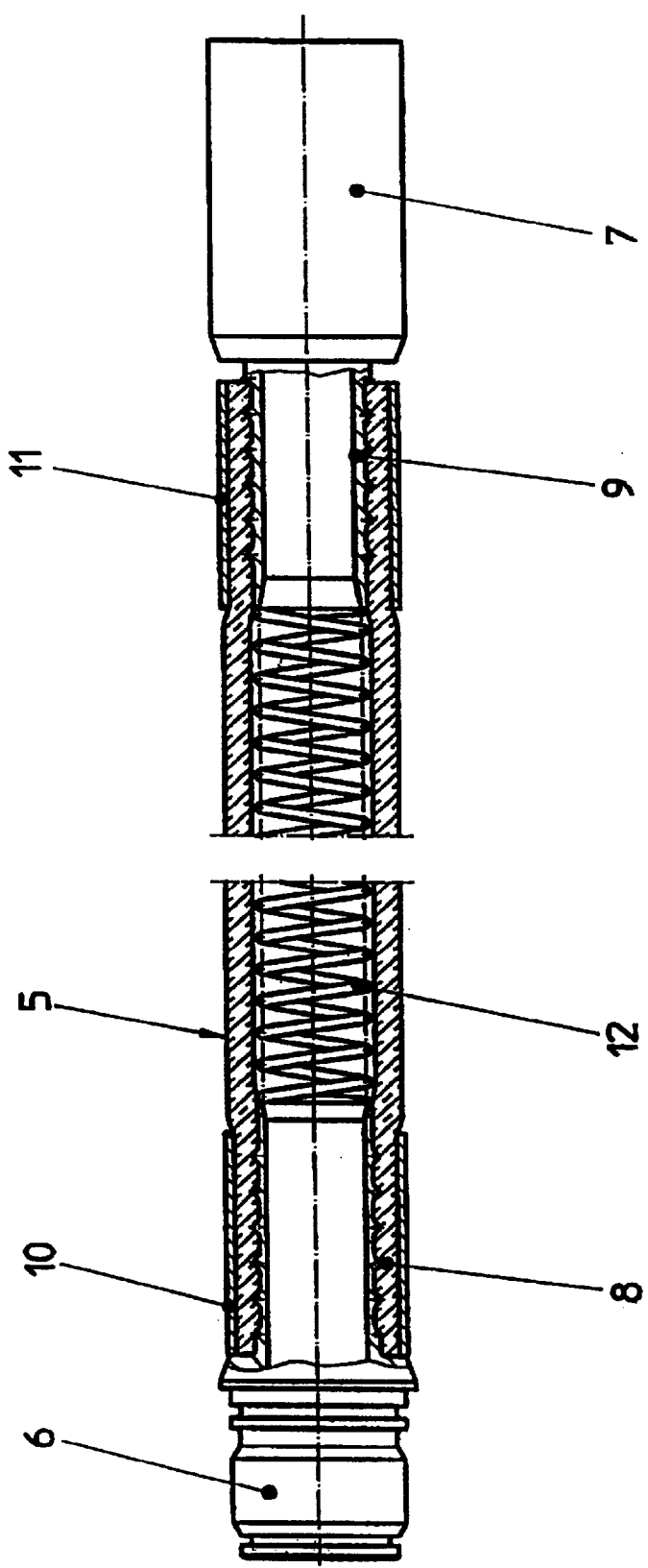
FIG. 2 an accompanying hose section.
Figure 3:
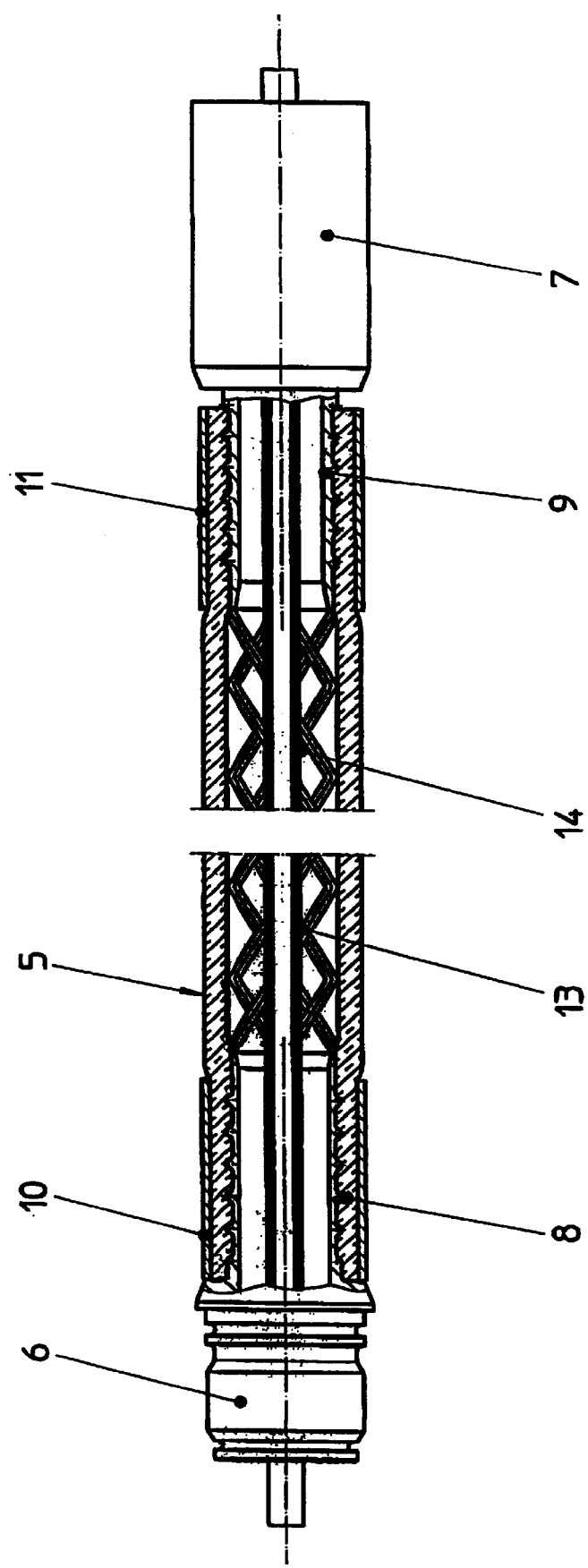
FIG. 3 a hose section with woven support.

The supply hose 3 is made up of a number of sections 5 the ends of which are fitted with couplings 6 and 7. The couplings are provided with nipples 8, 9 which extend into the hose, the hose being fastened to the said nipples by means of a crimped sleeve 10, 11. The inside of hose section 5 is provided with a corset in the form of a spiral 12 which extends between the two nipples 8, 9 of the couplings 6, 7. The windings of the spiral fit snugly to the hose wall and in the case of soft hose material they adapt easily to the shape of the hose thus strengthening and supporting it such that torsion is virtually eliminated and kinking has become impossible, even in the case of small radii.

In place of the spiral, expandable woven support wire 13 can be used which has the advantage that it can be drawn into the hose, bridging several hose sections 6 and couplings 6, 7. In addition a control air line 14 runs through the hose section 5 or supply hose. The windings of the support spiral and the wires of the woven support can be joined by means of a low friction plastic film.

I claim:

1. An earth boring apparatus comprising a hose to supply compressed air to a pneumatically operated reciprocating ram, the hose having a hose wall; and a corset to resist torsion, the corset snugly fitting the hose wall.

2. Earth boring apparatus according to claim 1, wherein the corset is located inside the hose.

3. Earth boring apparatus according to claim 1, wherein the corset surrounds the hose.

4. Earth boring apparatus according to claim 1, wherein the corset is wrapped in plastic film.

5. Earth boring apparatus according to claim 1, wherein the corset consists of a spiral.

6. Earth boring apparatus according to claim 1, wherein the corset consists of woven wire.

7. Earth boring apparatus according to claim 1, further comprising a supply hose comprising a number of sections with one or more couplings at their ends, locked to the hose to prevent hose rotation, and a corset extending from coupling to coupling.

8. Earth boring apparatus according to claim 7, wherein the supply hose accommodates at least one further hose.

9. Earth boring apparatus according to claim 7, wherein the corset is joined to the couplings.

10. Method of steering a thrust boring apparatus, comprising rotating one supply hose which is provided with at least one corset to resist torsion.

11. Method according to claim 10 wherein the corset consists of a spiral spring inside the air hose whereby the ends of the spring are fastened to one or more couplings.

12. An earth boring apparatus comprising:

a hose to supply pressurized air for a pneumatic percussion piston moved back and forth, the hose having a hose wall and a plurality of sections with couplings at their ends, locked to the hose to prevent hose rotation; and a supporting corset adjoining the hose wall, the supporting corset providing to the hose torsion resistance and a corset extending from coupling to coupling.

13. The earth boring apparatus according to claim 12 wherein the supporting corset provides torsion resistance for adjustment of control elements.

14. The earth boring apparatus according to claim 12 wherein the supporting corset provides torsion resistance for switching the apparatus from a forward operation to a reverse operation by rotating on the hose.

15. The earth boring apparatus according to claim 12, wherein the supporting corset is located inside the hose.

16. The earth boring apparatus according to claim 12, wherein the supporting corset surrounds the hose.

17. The earth boring apparatus according to claim 12, wherein the supporting corset is in the form of a spiral.

18. The earth apparatus according to claim 12, wherein the supporting corset is an expandable woven support wire.

19. The earth boring apparatus according to claim 12, wherein the corset is joined to the couplings.

\* \* \* \* \*